June 19, 1951 — H. L. BAXTER — 2,557,857
LOAD RESTRAINED AUTOMATIC RETURN GATE

Filed May 6, 1948 — 2 Sheets-Sheet 1

INVENTOR.
Henry L. Baxter
BY Victor J. Evans & Co.
ATTORNEYS

June 19, 1951   H. L. BAXTER   2,557,857
LOAD RESTRAINED AUTOMATIC RETURN GATE
Filed May 6, 1948   2 Sheets-Sheet 2
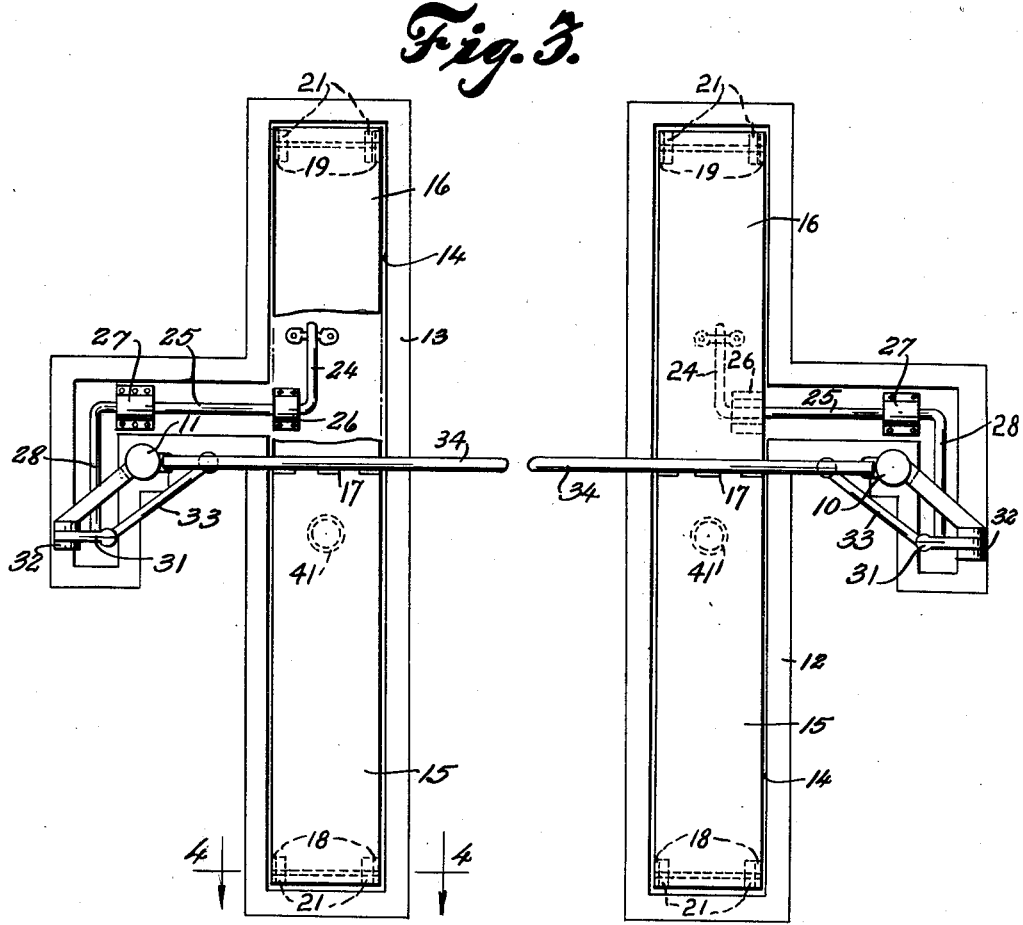
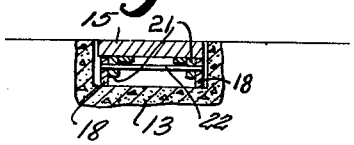
INVENTOR.
Henry L. Baxter
ATTORNEYS Patented June 19, 1951

2,557,857

UNITED STATES PATENT OFFICE 2,557,857

LOAD RESTRAINED AUTOMATIC RETURN GATE

Henry L. Baxter, Antlers, Okla.

Application May 6, 1948, Serial No. 25,379

1 Claim. (Cl. 39—18)

This invention relates to a gate opening device.

It is an object of the present invention to provide an automatic gate opening device which is operable under the weight of a vehicle to cause the gates to be opened as the vehicle nears the same and wherein after the vehicle has passed through the gate a spring will lift the operating platforms to cause the gate to be returned to its closed position and wherein the gate will be opened regardless from which direction the vehicle approaches the same, the runway on the side of the gate into which the gates are extended to open position being longer than the runway on the opposite side of the gate.

Other objects of the present invention are to provide a gate adapted to be operated by the weight of a vehicle, which is of simple construction, inexpensive to manufacture, easy to install, has minimum parts and efficient in operation.

For other objects and for a better understanding of the invention, reference may be had to the following detailed description taken in connection with the accompanying drawing, in which Fig. 1 is an elevational view of the gates having the operating mechanism of the present invention.

Fig. 3 is a top plan view of the gate arrangement.

Fig. 4 is a detail transverse sectional view taken on line 4—4 of Fig. 3.

Figure 1:
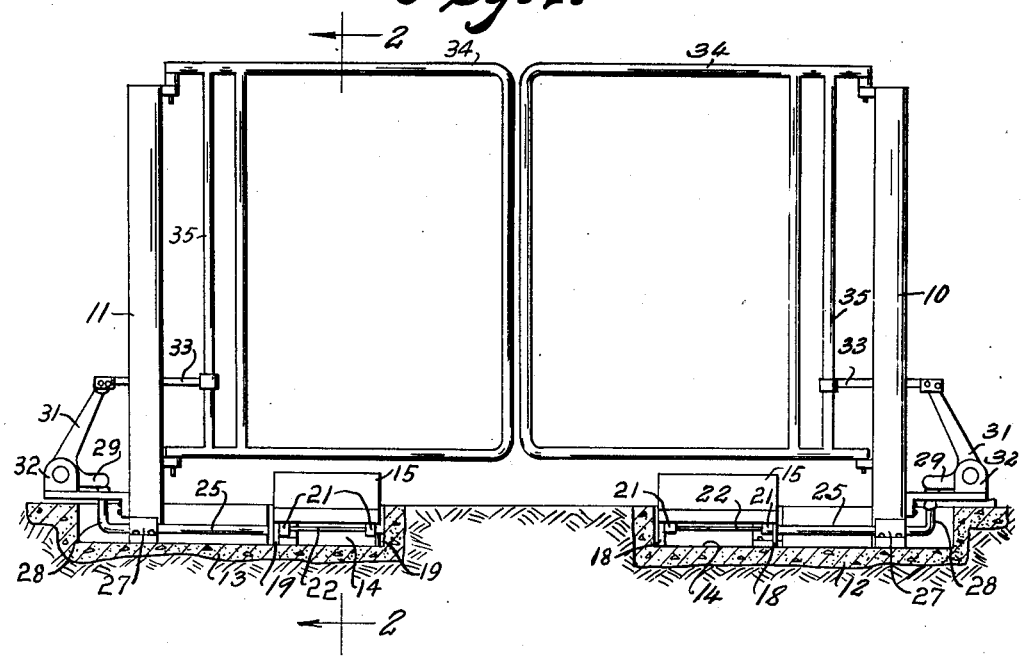
Figure 2:
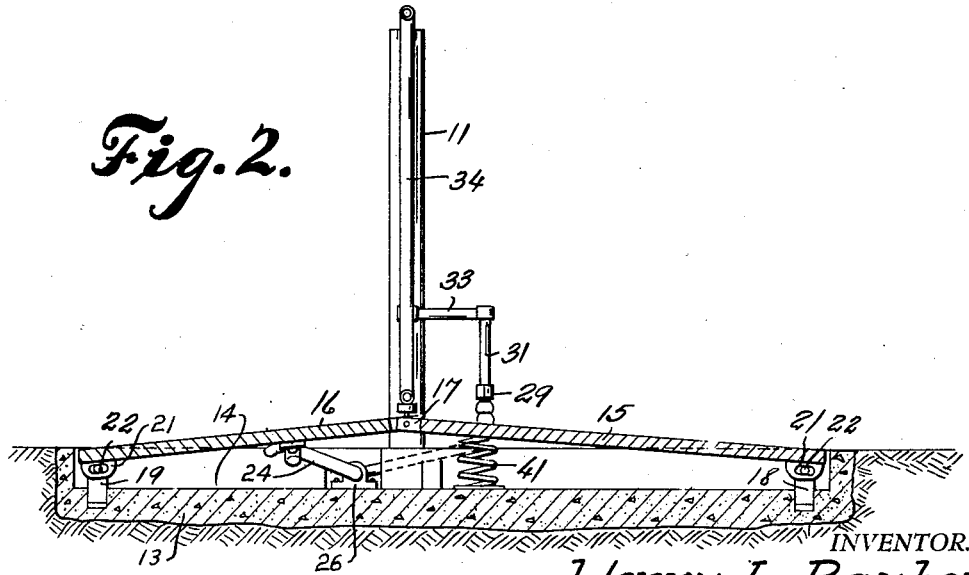
Fig. 2 is a sectional view, in elevation, taken on line 2—2 of Fig. 1.

Referring now to the figures, 10 and 11 represent vertically extending gate posts which are fixed respectively in foundations 12 and 13. Each of the foundations have openings in the same as indicated at 14 for receiving operating plates or ramps 15 and 16. The ramps 15 and 16 are hinged together at 17. Extending upwardly into the opening 14 from the bottom thereof are respectively brackets 18 and 19 for receiving the ends of the plates 15 and 16 respectively. Each of the plates have brackets thereon with elongated slots 21 through which a pin 22 extends for connecting the brackets to the upwardly extending brackets 18 and 19. This connection permits the longitudinal adjustment of the plates 15 and 16 when weight of a vehicle is brought to bear upon the plates.

A spring 41 is disposed in the opening 14 and adapted to normally maintain the plates 15 and 16 slightly out of the opening 14. As the vehicle is moved so that its wheels engage with either of the plates 15 and 16, the plates will be moved downwardly and each plate 16 will be brought to bear upon an arm 24 of a shaft 25 supported in bearings 26 and 27 in the opening 14 and which will cause an arm on the opposite end of the shaft 25 as indicated at 28 to be lifted against an arm 29 of a bell crank 31 pivoted on a bracket 32 connected with a post 10 or 11 and which will cause the upper end of the bell crank to be moved outwardly away from the post and pull a link 33 connected with a gate 34 hingedly connected to a post 10 or 11. The link 33 is connected to a vertically extending bar 35 of the gate. Accordingly, the gate will be automatically swung to an open position to permit the passage of the vehicle between the posts 10 and 11.

While the description has been directed to the arrangement at one side of the gate opening and to one post, it will be understood that the mechanism is identical at the opposite side of the gate opening and upon the other post.

The plate or ramp 15 is longer than the plate 16. This is so as to permit the gate 34 to be swung before the vehicle will reach a location a gate's distance from the post. Upon engaging the plate, the gates will swing toward the vehicle. Upon the vehicle engaging the short plate 16, the gates will move outwardly from the vehicle.

As soon as the vehicle has passed over the plates 15 and 16, the spring 41 will return the plates to their raised position and consequently the gates 34 will be returned to their closed positions across the gate opening and between the posts 10 and 11.

While various changes may be made in the detail construction, it shall be understood that such changes shall be within the spirit and scope of the present invention as defined by the appended claim.

I claim:

A gate arrangement comprising gate posts individually mounted and positioned opposite each other in opposite sides of a roadway, a concrete foundation having an elongated opening therein disposed adjacent each gate post, a gate hinged to each post and extending toward each other, ramp members disposed in the opening in each foundation and extending outwardly of each gate to the opposite sides of the gate opening, the ramp members in each opening being hinged to one another at their inner ends, a lost motion connection between the foundation and the free or outer ends of the ramp members, to permit longitudinal movement of said ramp members, a spring positioned in the opening in each foundation and engaging the ramp members to normally retain the ramp members in elevated position, a shaft mounted in each opening at right angles to said ramp members, an arm on the inner end of each shaft adapted to engage the respective ramp members, a second arm on the outer end of each shaft, a bel crank lever mounted on each foundation adjacent said last said arm, an arm on said bell crank lever adapted to be engaged by said second arm, a connecting link between each bell crank lever and each gate whereby when said ramp members are depressed by the weight of a vehicle passing thereover said shaft and said bell crank lever will cause said gates to open in advance of said vehicle.

HENRY L. BAXTER.

REFERENCES CITED

The following references are of record in the file of this patent:

UNITED STATES PATENTS

| Number | Name | Date |
| --- | --- | --- |
| 72,657 | Mawbey | Dec. 24, 1867 |
| 1,268,815 | Brazeal | June 11, 1918 |
| 1,289,751 | Hawkins | Dec. 31, 1918 |
| 1,903,208 | Williams | Mar. 28, 1933 |